US009449310B2

(12) United States Patent
Liang et al.

(10) Patent No.: US 9,449,310 B2
(45) Date of Patent: Sep. 20, 2016

(54) CHECK-IN METHOD AND SYSTEM BASED ON TWO-DIMENSIONAL CODE, SCANNING TERMINAL, AND DISPLAY TERMINAL

(71) Applicant: Tencent Technology (Shenzhen) Company Limited, Shenzhen (CN)

(72) Inventors: Fomu Liang, Shenzhen (CN); Jianbin Mao, Shenzhen (CN)

(73) Assignee: TENCENT TECHNOLOGY (SHENZHEN) COMPANY LIMITED, Shenzen, Guangdong Province (CN)

( * ) Notice: Subject to any disclaimer, the term of this patent is extended or adjusted under 35 U.S.C. 154(b) by 0 days.

(21) Appl. No.: 14/752,537

(22) Filed: Jun. 26, 2015

(65) Prior Publication Data

US 2015/0302361 A1 Oct. 22, 2015

Related U.S. Application Data

(63) Continuation of application No. PCT/CN2013/084862, filed on Oct. 9, 2013.

(30) Foreign Application Priority Data

Dec. 28, 2012 (CN) .......................... 2012 1 0586086

(51) Int. Cl.
 *G07C 9/00* (2006.01)
 *G06Q 10/10* (2012.01)
 *G07C 1/12* (2006.01)
 *G07C 1/10* (2006.01)
 *H04W 12/06* (2009.01)

(52) U.S. Cl.
 CPC ............. *G06Q 10/1091* (2013.01); *G07C 1/10* (2013.01); *G07C 1/12* (2013.01); *G07C 9/00007* (2013.01); *H04W 12/06* (2013.01)

(58) Field of Classification Search
 CPC combination set(s) only.
 See application file for complete search history.

(56) References Cited

U.S. PATENT DOCUMENTS

| 7,522,075 | B2 * | 4/2009 | Mak ........................ B64F 1/368 341/50 |
| 8,960,536 | B2 * | 2/2015 | Wright ................... G07B 15/02 235/378 |

(Continued)

FOREIGN PATENT DOCUMENTS

| CN | 102185839 A | 9/2011 |
| CN | 102622791 A | 8/2012 |

(Continued)

OTHER PUBLICATIONS

Tencent Technology, ISRWO, PCT/CN2013/084862, Jan. 16, 2014, 16 pgs.

*Primary Examiner* — Christle I Marshall
(74) *Attorney, Agent, or Firm* — Morgan, Lewis & Bockius LLP

(57) ABSTRACT

A check-in method based on a two-dimensional barcode and an associated system including a check-in management server, a scanning terminal, and a display terminal are provided. The check-in management server is communicatively connected to a display terminal and a scanning terminal, respectively. The check-in management server generates a two-dimensional barcode and sends the two-dimensional barcode to the display terminal, the two-dimensional barcode comprising a check-in identifier. The display terminal displays the two-dimensional barcode. The scanning terminal then scans the two-dimensional barcode, obtains a scanning timestamp and the check-in identifier, and sends a check-in request including a user identifier, the scanning timestamp, and the check-in identifier to the check-in management server. The check-in management server confirms the check-in request according to the check-in identifier and the user identifier, and records a check-in timestamp of the user according to the scanning timestamp.

17 Claims, 2 Drawing Sheets

(56) References Cited

U.S. PATENT DOCUMENTS

| | | | |
|---|---|---|---|
| 2006/0097041 A1* | 5/2006 | Funamoto | G06F 21/34 235/380 |
| 2008/0191909 A1* | 8/2008 | Mak | B64F 1/368 341/95 |
| 2010/0219234 A1* | 9/2010 | Forbes | G06Q 10/02 235/375 |
| 2013/0214041 A1* | 8/2013 | Wright | G07B 15/02 235/378 |

FOREIGN PATENT DOCUMENTS

| | | |
|---|---|---|
| CN | 102789584 A | 11/2012 |
| CN | 103136806 A | 6/2013 |
| JP | 2002149887 A | 5/2002 |

* cited by examiner

CHECK-IN METHOD AND SYSTEM BASED ON TWO-DIMENSIONAL CODE, SCANNING TERMINAL, AND DISPLAY TERMINAL

RELATED APPLICATIONS

This application is a continuation application of PCT Patent Application No. PCT/CN2013/084862, entitled "CHECK-IN METHOD AND SYSTEM BASED ON TWO-DIMENSIONAL CODE, SCANNING TERMINAL, AND DISPLAY TERMINAL" filed on Oct. 9, 2013, which claims priority to Chinese Patent Application No. 201210586086.1, filed with the Chinese Patent Office on Dec. 28, 2012 and entitled "CHECK-IN METHOD AND SYSTEM BASED ON TWO-DIMENSIONAL CODE, SCANNING TERMINAL, AND DISPLAY TERMINAL", both of which are incorporated herein by reference in their entirety.

FIELD OF THE TECHNOLOGY

The present disclosure relates to the computer field, and in particular, to a check-in method based on a two-dimensional barcode and an associated system including a check-in management server, a scanning terminal, and a display terminal.

BACKGROUND OF THE DISCLOSURE

Currently, many check-in manners are used. To check in a meeting or daily work, generally a pen and paper are used. In enterprises, the attendance management is generally conducted by using a machine, a fingerprint, and an inductive check-in manner based on the radio frequency technology. Other check-in manners include image recognition and biometric recognition technologies based on the human face and iris. However, at present, these check-in manners are still limited to scenarios such as a high-end meeting place and a highly confidential institution because of high technical complexity and high equipment cost.

With the development of the Internet and mobile Internet, a variety of new electronic check-in manners gradually emerge, such as mobile check-in based on location based service (LBS), that is, a user may use a mobile phone, a tablet, or other mobile devices to achieve fast check-in at the location where the user is by using a positioning system based on Global Positioning System (GPS) or BeiDou.

However, the existing check-in technology has the following disadvantages: the check-in using a pen and paper is mainly used in the meeting place, and the problems of this check-in manner includes inconvenient input, no electronic format available, and high statistics cost, and it is very difficult to prevent the problem of check-in for others; the machine check-in needs a new card every month, and requires a high statistics cost, and it is also very difficult to prevent the problem of check-in for others; the fingerprint, human face, and iris check-in manners based on the image recognition and biometric recognition technology has disadvantages of high equipment cost and low recognition rate; the inductive check-in manner has a high recognition speed, and is combined with a check-in system to achieve convenient statistics, but it also has the same problems of high procurement cost and check-in for others.

Although the LBS based check-in technology may record an account, a location and a check-in timestamp, the positioning accuracy is not high enough, and an association relationship between an operator and an account cannot be defined accurately. For example, a user A may check in by using the account of a user B, that is, the problem of check-in for others still exists.

SUMMARY

According to an aspect of the disclosure of the present application, a check-in method based on a two-dimensional barcode and an associated system including a check-in management server, a scanning terminal, and a display terminal are provided. The method, check-in management server, scanning terminal, and display terminal can solve the problems of high check-in cost and check-in for others in the existing technology.

According to an embodiment of the present disclosure, a check-in method based on a two-dimensional barcode is provided. The method includes the following steps: the check-in management server generating a two-dimensional barcode and sending the two-dimensional barcode to the display terminal, the two-dimensional barcode comprising a check-in identifier; the display terminal displaying the two-dimensional barcode; the scanning terminal scanning the two-dimensional barcode, obtaining a scanning timestamp and the check-in identifier, and sending a check-in request including a user identifier, the scanning timestamp, and the check-in identifier to the check-in management server; and the check-in management server confirming the check-in request according to the check-in identifier and the user identifier, and recording a check-in timestamp of the user according to the scanning timestamp.

According to another embodiment of the present disclosure, a check-in system based on a two-dimensional barcode is provided, the check-in system including: at least one display terminal as described above, at least one scanning terminal as described above, and one check-in management server, where the check-in management server is configured to generate a two-dimensional barcode and send the two-dimensional barcode to the display terminal, the two-dimensional barcode comprising a check-in identifier; the display terminal is configured to display the two-dimensional barcode; the scanning terminal is configured to scan the two-dimensional barcode, obtain a scanning timestamp and the check-in identifier, and send a check-in request including a user identifier, the scanning timestamp, and the check-in identifier to the check-in management server; and the check-in management server is configured to confirm the check-in request according to the check-in identifier and the user identifier, and recording a check-in timestamp of the user according to the scanning timestamp.

According to yet another embodiment of the present disclosure, a non-transitory computer readable storage medium stores one or more programs, where the one or more programs are executed by a check-in system including a check-in management server that is communicatively connected to a display terminal and a scanning terminal, respectively, for performing a check-in method based on a two-dimensional barcode as described above.

During the implementation of the embodiments of the present disclosure, the check-in management server generates the two-dimensional barcode used during check-in; the display terminal displays the two-dimensional barcode; the scanning terminal scans the two-dimensional barcode displayed by the display terminal, obtains information in the two-dimensional barcode, and sends the information, the scanning timestamp, and the user identifier to the check-in management server, enabling the check-in management server to confirm and record the check-in request. Because the two-dimensional barcode scanning is quick and unique, the two-dimensional barcode scanning achieves fast check-in, and the problem of check-in for others is less likely to occur.

BRIEF DESCRIPTION OF THE DRAWINGS

In order to illustrate technical solutions of the embodiments of the present disclosure more clearly, accompanying drawings that need to be used in the embodiments or the existing technology will be described below. Apparently, the accompanying drawings described below are only some embodiments of the present disclosure. Persons of ordinary skill in the art may obtain other drawings according to these accompanying drawings without creative efforts.

DESCRIPTION OF EMBODIMENTS

Specific embodiments of the present disclosure will be described in detail in the following with reference to the accompanying drawings. It should be understood that the specific embodiments described herein are only used to explain the present disclosure and are not used to limit the present disclosure.

The technical solutions of the specific embodiments will be described in detail in the following.

Embodiment 1

Figure 1:
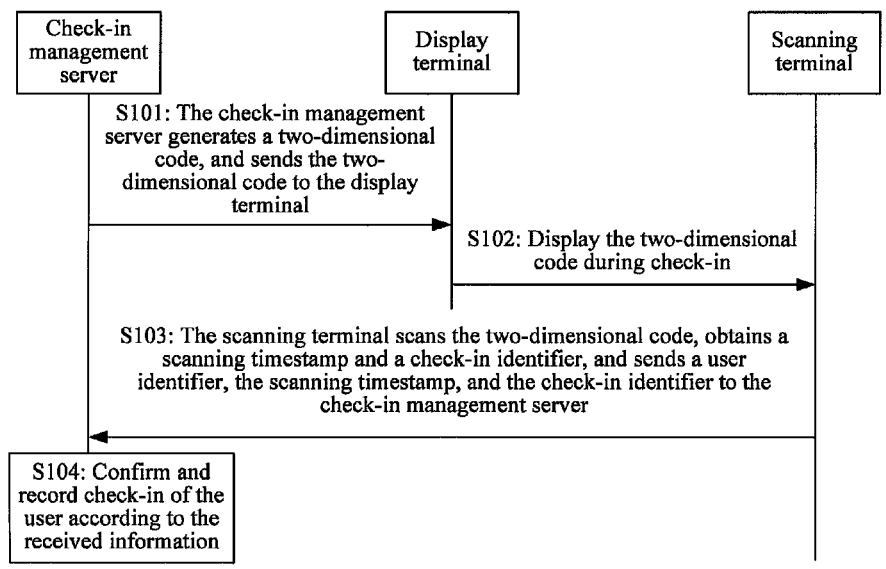
FIG. 1 is a flowchart of a check-in method based on a two-dimensional barcode according to an embodiment of the present disclosure.

FIG. 1 is a flowchart of a check-in method based on a two-dimensional barcode according to an embodiment of the present disclosure. The method includes the following steps:

In step S101, a check-in management server generates a two-dimensional barcode, and sends the two-dimensional barcode to a display terminal. The two-dimensional barcode includes a check-in identifier.

In this embodiment of the present disclosure, the check-in management server generates the two-dimensional barcode locally, and sends the generated two-dimensional barcode to the display terminal that displays the two-dimensional barcode. The information in the two-dimensional barcode is used as an identifier during check-in, so that in subsequent steps, the check-in management server receives the check-in identifier sent by a scanning terminal, and uses the timestamp when the scanning terminal sends the check-in identifier as a check-in timestamp of a user corresponding to the scanning terminal. In some embodiments, the check-in identifier is dynamically generated by the check-in management server and uniquely associated with a user identifier. In other words, one check-in identifier cannot be associated with two distinct a user identifiers.

In step S102, the display terminal receives the two-dimensional barcode, and displays the two-dimensional barcode during check-in.

In one embodiment of the present disclosure, the display terminal is a mobile terminal such as a mobile phone or a tablet that has a wireless connection to the check-in management server, and the scanning terminal is a fixed terminal arranged somewhere that has a wired connection to the check-in management server; in another embodiment of the present disclosure, the display terminal is a fixed terminal arranged somewhere that has a wired connection to the check-in management server, and the scanning terminal is a mobile terminal such as a mobile phone or a tablet that has a wireless connection to the check-in management server. After the display terminal receives the two-dimensional barcode sent by the check-in management server, when the user checks in on the scanning terminal, the two-dimensional barcode is displayed to the scanning terminal.

In step S103, the scanning terminal scans the two-dimensional barcode, obtains a scanning timestamp and the check-in identifier, and sends a check-in request including a user identifier, the scanning timestamp, and the check-in identifier to the check-in management server. The user identifier uniquely identifies a user that uses the display terminal or the scanning terminal.

In this embodiment of the present disclosure, when the user checks in by using the scanning terminal, the two-dimensional barcode displayed by the display terminal is scanned by using the scanning terminal, the scanning timestamp and the check-in identifier are obtained, and the user identifier, the scanning timestamp, and the check-in identifier are sent to the check-in management server. The method for obtaining the user identifier includes:

(1) if the scanning terminal is a mobile terminal, and the display device is a fixed terminal, the user inputting the user identifier directly on the scanning terminal; and (2) if the scanning terminal is a fixed device, and the display terminal is a mobile device, the user inputting the user identifier on the display terminal, and when the scanning terminal scans the two-dimensional barcode, the user identifier being sent to the scanning terminal.

In this embodiment of the present disclosure, the mobile terminal is usually in a one-to-one correspondence relationship with the user, so the user identifier is usually obtained through the mobile terminal: if the scanning terminal is the mobile terminal, the user may input the user identifier directly on the scanning terminal; if the scanning terminal is the fixed terminal, and the display terminal is the mobile terminal, the user may input the user identifier on the display terminal, and when the scanning terminal scans the two-dimensional barcode, the user identifier is sent to the scanning terminal. The a user identifier includes, but is not limited to: a mobile phone number or a password or a fingerprint set in the check-in management server.

In step S104, the check-in management server confirms the check-in request according to the check-in identifier and the user identifier, and records a check-in timestamp of the user according to the scanning timestamp.

In this embodiment of the present disclosure, after receiving the information sent by the scanning terminal, the check-in management server confirms the check-in request according to the check-in identifier and the user identifier, and after the confirmation, records the received a scanning timestamp as the check-in timestamp of the user.

In some embodiments, the check-in management server generates a check-in record including the check-in identifier, the user identifier, and the check-in timestamp and returns a check-in response to the scanning terminal or the display terminal, the check-in response including a link to the check-in record at the check-in management server.

In yet some other embodiments, after confirming the check-in request, the check-in management server generates a new two-dimensional barcode and sends the new two-dimensional barcode to the display terminal, the new two-dimensional barcode comprising a new check-in identifier. As noted above, the new check-in identifier is different from the previous one. The display terminal then displays the new two-dimensional barcode for another user to perform a new check-in request.

In this embodiment of the present disclosure, the check-in management server generates the two-dimensional barcode used during check-in; the display terminal displays the two-dimensional barcode; the scanning terminal scans the two-dimensional barcode displayed by the display terminal, obtains information in the two-dimensional barcode, and sends the information, the scanning timestamp, and the user identifier to the check-in management server, so that the check-in management server confirms and records the check-in request. Because the two-dimensional barcode scanning is quick and unique, the two-dimensional barcode scanning achieves fast check-in, and the problem of check-in for others is less likely to occur.

Embodiment 2

Figure 2:
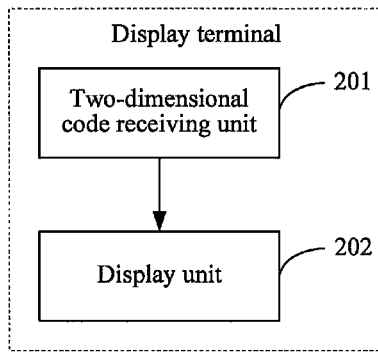
FIG. 2 is a structural block diagram of a display terminal according to an embodiment of the present disclosure.

FIG. 2 is a structural block diagram of a display terminal according to an embodiment of the present disclosure, and for ease of description, only parts related to the embodiment of the present disclosure are shown, including a two-dimensional barcode receiving unit 201 and a display unit 202.

The two-dimensional barcode receiving unit 201 is configured to receive a two-dimensional barcode generated by a check-in management server, the two-dimensional barcode including a check-in identifier.

In this embodiment of the present disclosure, the two-dimensional barcode receiving unit 201 of the display terminal first receives the two-dimensional barcode generated by the check-in management server. The information in the two-dimensional barcode is used as the identifier, so that the user checks in according to the check-in identifier.

The display unit 202 is configured to display the two-dimensional barcode received by the two-dimensional barcode receiving unit 201 during check-in, so that the scanning terminal obtains the information in the two-dimensional barcode.

In this embodiment of the present disclosure, after the display terminal receives the two-dimensional barcode sent by the check-in management server, when the user checks in on the scanning terminal, the two-dimensional barcode is displayed to the scanning terminal, so that the scanning terminal obtains the displayed two-dimensional barcode, and further obtains the information in the two-dimensional barcode.

In this embodiment of the present disclosure, the scanning terminal receives the two-dimensional barcode for check-in sent by the check-in management server, and displays the two-dimensional barcode during check-in, so that the scanning terminal obtains the information in the two-dimensional barcode, and the user checks in by using the two-dimensional barcode conveniently.

Embodiment 3

Figure 3:
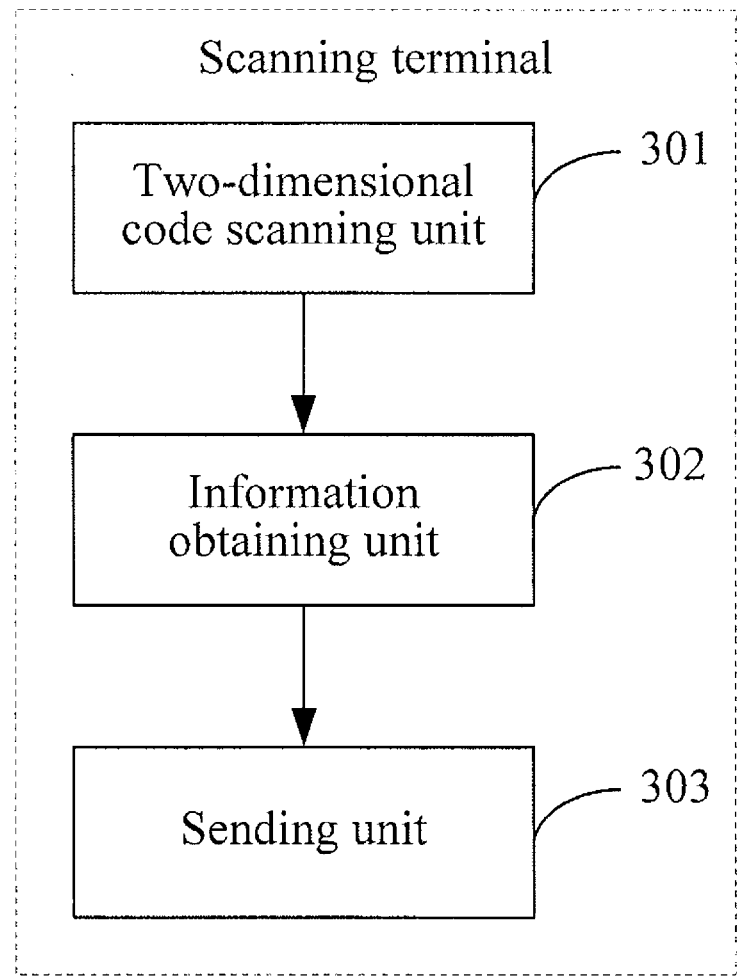
FIG. 3 is a structural block diagram of a scanning terminal according to an embodiment of the present disclosure.

FIG. 3 is a structural block diagram of a scanning terminal according to an embodiment of the invention, and for ease of the description, only parts related to the embodiment of the invention are shown, including a two-dimensional barcode scanning unit 301, an information obtaining unit 302, and a sending unit 303.

The two-dimensional barcode scanning unit 301 is configured to scan a two-dimensional barcode displayed by a display terminal, the two-dimensional barcode including a check-in identifier.

In this embodiment of the present disclosure, when a user checks in through the scanning terminal, first the two-dimensional barcode displayed by the display terminal is scanned by the two-dimensional barcode scanning unit 301 of the scanning terminal. The two-dimensional barcode includes the check-in identifier, and the two-dimensional barcode is obtained by the display terminal from a check-in management server.

The information obtaining unit 302 is configured to obtain a scanning timestamp and the check-in identifier from the two-dimensional barcode scanned by the two-dimensional barcode scanning unit 301.

In this embodiment of the present disclosure, after the user obtains the two-dimensional barcode through the two-dimensional barcode scanning unit 301 of the scanning terminal, and obtains the scanning timestamp and the check-in identifier. The method for obtaining the information in the two-dimensional barcode is the same as that in the existing technology, and is not described herein.

The sending unit 303 is configured to send a user identifier and the scanning timestamp and the check-in identifier obtained by the information obtaining unit 302 to the check-in management server.

In this embodiment of the present disclosure, after the user obtains the information in the two-dimensional barcode through the scanning terminal, the information in the two-dimensional barcode and the user identifier is sent to the check-in management server, so that the check-in management server confirms the check-in request according to the received information functioning as the check-in identifier and the user identifier, and records the check-in timestamp of the user according to the scanning timestamp. The a user identifier includes, but is not limited to: a mobile phone number, a password or a fingerprint set in the check-in management server. The method for obtaining the user identifier includes:

(1) if the scanning terminal is a mobile terminal, and the display device is a fixed terminal, the user inputting the user identifier directly on the scanning terminal; and (2) if the scanning terminal is a fixed device, and the display terminal is a mobile device, the user inputting the user identifier on the scanning terminal, and when the scanning terminal scans the two-dimensional barcode, the user identifier being sent to the scanning terminal.

In this embodiment of the present disclosure, the check-in management server generates the two-dimensional barcode used during check-in; the display terminal displays the two-dimensional barcode; the scanning terminal scans the two-dimensional barcode displayed by the display terminal, obtains information in the two-dimensional barcode, and sends the information, the scanning timestamp, and the user identifier to the check-in management server, so that the check-in management server confirms and records the check-in request. Because the two-dimensional barcode scanning is quick and unique, the two-dimensional barcode scanning achieves fast check-in, and the problem of check-in for others is less likely to occur.

Embodiment 4

This embodiment of the present disclosure further provides a check-in system based on a two-dimensional barcode. The system includes:

at least one display terminal as described above, at least one scanning terminal as described above, and one check-in management server, where the check-in management server is configured to generate the two-dimensional barcode, receive the user identifier, the scanning timestamp, and the check-in identifier in the two-dimensional barcode sent by the scanning terminal, and confirms and records check-in request.

In this embodiment of the present disclosure, the scanning terminal and the display terminal may be categorized into two types:

(1) when the display terminal is a mobile terminal such as a mobile phone or a tablet, the scanning terminal is a fixed terminal arranged somewhere; and (2) when the display terminal is a fixed terminal arranged somewhere, the scanning terminal is a mobile terminal such as a mobile phone or a tablet.

In this embodiment of the present disclosure, the check-in management server generates the two-dimensional barcode used during check-in, the display terminal displays the two-dimensional barcode, the scanning terminal scans the two-dimensional barcode displayed by the display terminal, obtains information in the two-dimensional barcode, and sends the information, the scanning timestamp, and the user identifier to the check-in management server, so that the check-in management server confirms and records the check-in request. Because the two-dimensional barcode scanning is quick and unique, the two-dimensional barcode scanning achieves fast check-in, and the problem of check-in for others is less likely to occur.

Persons of ordinary skill in the art should understand that units in the embodiments described above are divided according to functional logic, and not limited to the division described above, as long as corresponding functions can be achieved. In addition, specific names of the functional units are defined only for convenient distinction, and are not used to limit the protection scope of the present disclosure.

Persons of ordinary skill in the art should also understand that all or some of the steps of the methods according to the embodiments described above may be achieved through relevant software instructed by a program. The program may be stored in a computer non-transitory computer readable storage medium. The storage medium includes ROM/RAM, a magnetic disk, an optical disc, and the like.

Specific implementation manners are described above, which, however, are not used to limit the protection scope of the present disclosure. The protection scope of the present disclosure is defined by the following appended claims. Any modification, replacement or improvement made within the spirit and principle of the present disclosure shall fall with the protection scope of the claims of the present disclosure.

What is claimed is:

1. A check-in method based on a two-dimensional barcode performed by a check-in system including a check-in management server that is communicatively connected to a display terminal and a scanning terminal, respectively, the method comprising:
    the check-in management server generating a two-dimensional barcode and sending the two-dimensional barcode to the display terminal, the two-dimensional barcode comprising a check-in identifier;
    the display terminal displaying the two-dimensional barcode;
    the scanning terminal scanning the two-dimensional barcode, obtaining a scanning timestamp and the check-in identifier, and sending a check-in request including a user identifier, the scanning timestamp, and the check-in identifier to the check-in management server via a wireless communication channel; and
    the check-in management server confirming the check-in request according to the check-in identifier and the user identifier, and recording a check-in timestamp of the user according to the scanning timestamp by generating a check-in record including the check-in identifier, the user identifier, and the check-in timestamp.

2. The method according to claim 1, wherein the check-in identifier is dynamically generated and uniquely associated with the user identifier.

3. The method according to claim 1, further comprising:
    the check-in management server returning a check-in response to the scanning terminal or the display terminal via the wireless communication channel, the check-in response including a link to the check-in record at the check-in management server.

4. The method according to claim 1, wherein the display terminal is a fixed terminal that has a wired connection to the check-in management server and the scanning terminal is a mobile terminal that has a wireless connection to the check-in management server.

5. The method according to claim 1, further comprising:
    after confirming the check-in request:
        the check-in management server generating a new two-dimensional barcode and sending the new two-dimensional barcode to the display terminal, the new two-dimensional barcode comprising a new check-in identifier; and
        the display terminal displaying the new two-dimensional barcode.

6. The method according to claim 1, wherein the user identifier is one selected from the group consisting of a mobile phone number of the user or a password or a fingerprint of the user set in the check-in management server.

7. A check-in system based on a two-dimensional barcode, comprising:
    a check-in management server;
    a display terminal that is communicatively connected to the check-in management server; and
    a scanning terminal that is communicatively connected to the check-in management server, wherein:
        the check-in management server is configured to generate a two-dimensional barcode and send the two-dimensional barcode to the display terminal, the two-dimensional barcode comprising a check-in identifier;
        the display terminal is configured to display the two-dimensional barcode;
        the scanning terminal is configured to scan the two-dimensional barcode, obtain a scanning timestamp and the check-in identifier, and send a check-in request including a user identifier, the scanning timestamp, and the check-in identifier to the check-in management server via a wireless communication channel; and
        the check-in management server is configured to confirm the check-in request according to the check-in identifier and the user identifier, and recording a check-in timestamp of the user according to the scanning timestamp by generating a check-in record including the check-in identifier, the user identifier, and the check-in timestamp.

8. The check-in system according to claim 7, wherein the check-in identifier is dynamically generated and uniquely associated with the user identifier.

9. The check-in system according to claim 7, wherein:
    the check-in management server is further configured to return a check-in response to the scanning terminal or the display terminal via the wireless communication channel, the check-in response including a link to the check-in record at the check-in management server.

10. The check-in system according to claim 7, wherein the display terminal is a fixed terminal that has a wired connection to the check-in management server and the scanning terminal is a mobile terminal that has a wireless connection to the check-in management server.

11. The check-in system according to claim 7, wherein, after confirming the check-in request, the check-in management server is configured to generate a new two-dimensional barcode and send the new two-dimensional barcode to the display terminal, the new two-dimensional barcode comprising a new check-in identifier and the display terminal is configured to display the new two-dimensional barcode.

12. A non-transitory computer readable storage medium storing one or more programs, wherein the one or more programs are executed by a check-in system including a check-in management server that is communicatively connected to a display terminal and a scanning terminal, respectively, for performing a check-in method based on a two-dimensional barcode, and the method including:
the check-in management server generating a two-dimensional barcode and sending the two-dimensional barcode to the display terminal, the two-dimensional barcode comprising a check-in identifier;
the display terminal displaying the two-dimensional barcode;
the scanning terminal scanning the two-dimensional barcode, obtaining a scanning timestamp and the check-in identifier, and sending a check-in request including a user identifier, the scanning timestamp, and the check-in identifier to the check-in management server via a wireless communication channel; and
the check-in management server confirming the check-in request according to the check-in identifier and the user identifier, and recording a check-in timestamp of the user according to the scanning timestamp by generating a check-in record including the check-in identifier, the user identifier, and the check-in timestamp.

13. The non-transitory computer readable storage medium according to claim 12, wherein the check-in identifier is dynamically generated and uniquely associated with the user identifier.

14. The non-transitory computer readable storage medium according to claim 12, wherein the method further comprises:
the check-in management server returning a check-in response to the scanning terminal or the display terminal via the wireless communication channel, the check-in response including a link to the check-in record at the check-in management server.

15. The non-transitory computer readable storage medium according to claim 12, wherein the display terminal is a fixed terminal that has a wired connection to the check-in management server and the scanning terminal is a mobile terminal that has a wireless connection to the check-in management server.

16. The non-transitory computer readable storage medium according to claim 12, wherein the method further comprises:
after confirming the check-in request:
the check-in management server generating a new two-dimensional barcode and sending the new two-dimensional barcode to the display terminal, the new two-dimensional barcode comprising a new check-in identifier; and
the display terminal displaying the new two-dimensional barcode.

17. The non-transitory computer readable storage medium according to claim 12, wherein the user identifier is one selected from the group consisting of a mobile phone number of the user or a password or a fingerprint of the user set in the check-in management server.

* * * * *